(12) United States Patent
Johnson

(10) Patent No.: US 6,508,165 B2
(45) Date of Patent: *Jan. 21, 2003

(54) BARBECUE GRILL ASSEMBLY HAVING A WORK SURFACE WITH SLIDE MECHANISM

(75) Inventor: Mark Johnson, Wilmette, IL (US)

(73) Assignee: Weber-Stephen Products Co., Palatine, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/922,332

(22) Filed: Aug. 3, 2001

(65) Prior Publication Data

US 2002/0020303 A1 Feb. 21, 2002

Related U.S. Application Data

(63) Continuation of application No. 09/637,306, filed on Aug. 11, 2000, now Pat. No. 6,308,616.

(51) Int. Cl.$^7$ .............. A23L 1/00; A47J 37/00; A47J 37/04; F24C 3/00; F24C 3/04
(52) U.S. Cl. .............. 99/339; 99/340; 99/446; 99/450; 99/482; 126/25 R; 126/41 R
(58) Field of Search .............. 99/337–341, 385, 99/400, 401, 419–421 V, 444–450, 481, 482; 126/41 R, 25 R, 9 R, 318, 334, 9 B, 276, 39 R, 39 E, 39 N, 39 G; 219/385, 400

(56) References Cited

U.S. PATENT DOCUMENTS

| 1,964,805 | A | 7/1934 | Barnes |
| 2,207,307 | A | 7/1940 | Teller et al. |
| 2,349,307 | A | 5/1944 | Reeves |
| 2,780,474 | A | 2/1957 | Farah et al. |

(List continued on next page.)

OTHER PUBLICATIONS

Brochure entitled "Weber Gas Barbecues," Summit 400 Series Gas Barbecue, Weber–Stephen Products Co., 8/96.
Brochure entitled "Platinum Series II", Platinum Series II 3400, Weber–Stephen Products Co., 3/97.
International Search Report for PCT/US01/23212 mailed Feb. 25, 2002.

Primary Examiner—Timothy F. Simone
(74) Attorney, Agent, or Firm—Wallenstein & Wagner, Ltd.

(57) ABSTRACT

The present invention is a barbecue grill assembly having a frame with a work surface secured by a sliding mechanism, such as a sliding track assembly. The present invention alternatively provides a work surface being a slidable burner cover assembly for an auxiliary burner of a barbecue gas grill. The assembly includes a burner cover having a body portion disposed over the auxiliary burner in a closed position and a slide mechanism attached to the grill and the cover to allow the cover to be slidably moved from the closed position to a second position wherein the auxiliary burner is exposed from underneath the body portion of the burner cover. The slide mechanism also provides extended cantilever support for the work surface in the second position.

23 Claims, 4 Drawing Sheets

U.S. PATENT DOCUMENTS

| | | |
|---|---|---|
| 2,817,331 A | 12/1957 | Kaplan et al. |
| 2,888,544 A | 5/1959 | Kesling |
| 2,903,549 A | 9/1959 | Joseph |
| 2,907,316 A | 10/1959 | Windust |
| 2,946,275 A | 7/1960 | Compton |
| 3,081,692 A | 3/1963 | Sorensen |
| 3,559,564 A | 2/1971 | Turner et al. |
| 3,709,142 A | 1/1973 | Peterson |
| 3,713,846 A | 1/1973 | Turner et al. |
| 3,802,413 A | 4/1974 | Pepin |
| 4,166,413 A | 9/1979 | Meszaros |
| 4,677,964 A | 7/1987 | Lohmeyer et al. |
| 4,696,282 A | 9/1987 | Incitti |
| D293,067 S | 12/1987 | Stephen et al. |
| 4,869,228 A | 9/1989 | Sorensen |
| 4,886,045 A | 12/1989 | Ducate, Jr. et al. |
| D316,355 S | 4/1991 | Stephen et al. |
| 5,027,788 A | 7/1991 | Schlosser et al. |
| 5,065,734 A | 11/1991 | Elliott |
| 5,070,776 A | 12/1991 | Schlosser et al. |
| 5,076,252 A | 12/1991 | Schlosser et al. |
| 5,090,398 A | 2/1992 | Raymer et al. |
| 5,104,080 A | 4/1992 | Berger |
| D327,390 S | 6/1992 | Schlosser et al. |
| 5,203,317 A | 4/1993 | James |
| 5,213,027 A | 5/1993 | Tsotsos et al. |
| 5,341,793 A | 8/1994 | Brown |
| 5,483,947 A | 1/1996 | Giebel et al. |
| 5,575,198 A | 11/1996 | Lowery |
| 5,632,265 A | 5/1997 | Koziol |
| D380,933 S | 7/1997 | Schlosser et al. |
| 5,741,536 A | 4/1998 | Mauer et al. |
| D395,378 S | 6/1998 | Schlosser et al. |
| 5,765,469 A | 6/1998 | Schlosser et al. |
| 5,767,487 A | 6/1998 | Tippmann |
| 5,768,983 A | 6/1998 | Treiber |
| D404,963 S | 2/1999 | Schlosser et al. |
| 5,873,355 A | 2/1999 | Schlosser et al. |
| 5,934,183 A | 8/1999 | Schlosser et al. |
| 5,934,184 A | 8/1999 | Schlosser et al. |
| 5,941,229 A | 8/1999 | Schlosser et al. |
| 6,038,616 A1 * | 10/2001 | Johnson ...................... 99/339 |

\* cited by examiner

BARBECUE GRILL ASSEMBLY HAVING A WORK SURFACE WITH SLIDE MECHANISM

RELATED APPLICATIONS

This application is a continuation of U.S. patent application Ser. No. 09/637,306 filed Aug. 11, 2000 now U.S. Pat. No. 6,308,616, (pending) the disclosure of which is hereby incorporated by reference and made part hereof.

TECHNICAL FIELD

The present invention relates generally to outdoor cooking devices, such as a barbecue grill, and more particularly to a barbecue gas grill having one or more work surfaces, at least one of the work surface providing a cover for a side cooking burner.

BACKGROUND OF THE INVENTION

Barbecue grills, and in particular gas grills, have become increasingly popular in recent years. Conventionally, gas grills consist of a cart or frame that supports a firebox. The gas grills include a burner assembly adjacent to a lower portion of the firebox and a cooking grid supported along the upper edge of the firebox. The firebox usually includes a hinged cover to create a cooking chamber. Typically, lava rock is disposed between the cooking grid and the burner assembly. The lava rock, acting as a form of a conductive member, absorbs the heat from the burning gas and provides a generally uniform heat producing means for the food being cooked. Alternatively, the firebox may contain a metal barrier, such as sear bars positioned between the cooking grid and the gas burners, such as those disclosed in U.S. Pat. No. 4,677,964.

Other gas grill features that have become popular are side burners and work surfaces. A side burner is an auxiliary cooking surface located outside the cooking chamber. These side burners are usually disposed next to the cooking chamber on the grill frame, such as that which is disclosed in U.S. Pat. Nos. 4,677,964 and 4,777,927, both assigned to the Assignee of the present invention. The side burner is often desirable because it allows certain food items to be cooked separately from and simultaneously with the food items being cooked within the cooking chamber. To protect the burner from environmental conditions and for safety reasons, the side burner is usually provided with a burner cover.

One or more work surfaces are also desirable and convenient because they provide a surface upon which food and food preparation items, such as spices, sauces, utensils, plates, etc., can be placed while the food is being prepared. These work surfaces are also usually disposed immediately adjacent to the cooking chamber on the grill frame. A work surface may also be provided extended outward from the front of the barbecue grill cart, such as is disclosed in U.S. Pat. No. 5,070,776 and co-pending application Ser. No. 09/374,821, filed on Aug. 13, 1999, both assigned to the Assignee of the present invention, Weber-Stephen Products Company.

Due to size limitations of a gas grill and space constraints on the grill frame, it is often difficult to accommodate more than one of these features within the grill, particularly when these features are desired in the same grill and are disposed immediately adjacent to the cooking chamber.

Therefore, it is an object of the present invention to provide a work surface having a slide track mechanism that allows the work surface to be moved to a use position. It is further an object of the invention to provide a side burner cover that is slidable to expose the burner and also serve as a work surface for food preparation.

SUMMARY OF THE INVENTION

The present invention is a barbecue grill assembly having a frame with a work surface secured by a sliding mechanism, such as a sliding track assembly. The present invention alternatively provides a work surface being a slidable burner cover assembly for an auxiliary burner of a barbecue gas grill. The assembly includes a burner cover having a body portion disposed over the auxiliary burner in a closed position and a slide mechanism attached to the grill and the cover to allow the cover to be slidably moved from the closed position to a second position wherein the auxiliary burner is exposed from underneath the body portion of the burner cover. The slide mechanism also provides extended cantilever support for the work surface in the second position.

The slidable arrangement of the assembly provides a combination work surface and burner cover that minimizes space constraints with respect to the grill frame. The slidable cover also provides a work surface that can be positioned on the same side of the grill frame as the auxiliary burner without requiring a larger grill frame for support. This reduces the overall size requirements of the grill. This assembly also provides a shelf selectively placed in a use position to extend forward from the barbecue grill frame by extending the shelf outward along a sliding track assembly. Other features and advantages of the invention will be apparent from consideration of the following specification and drawings.

DETAILED DESCRIPTION OF THE PREFERRED EMBODIMENT

Figure 1:
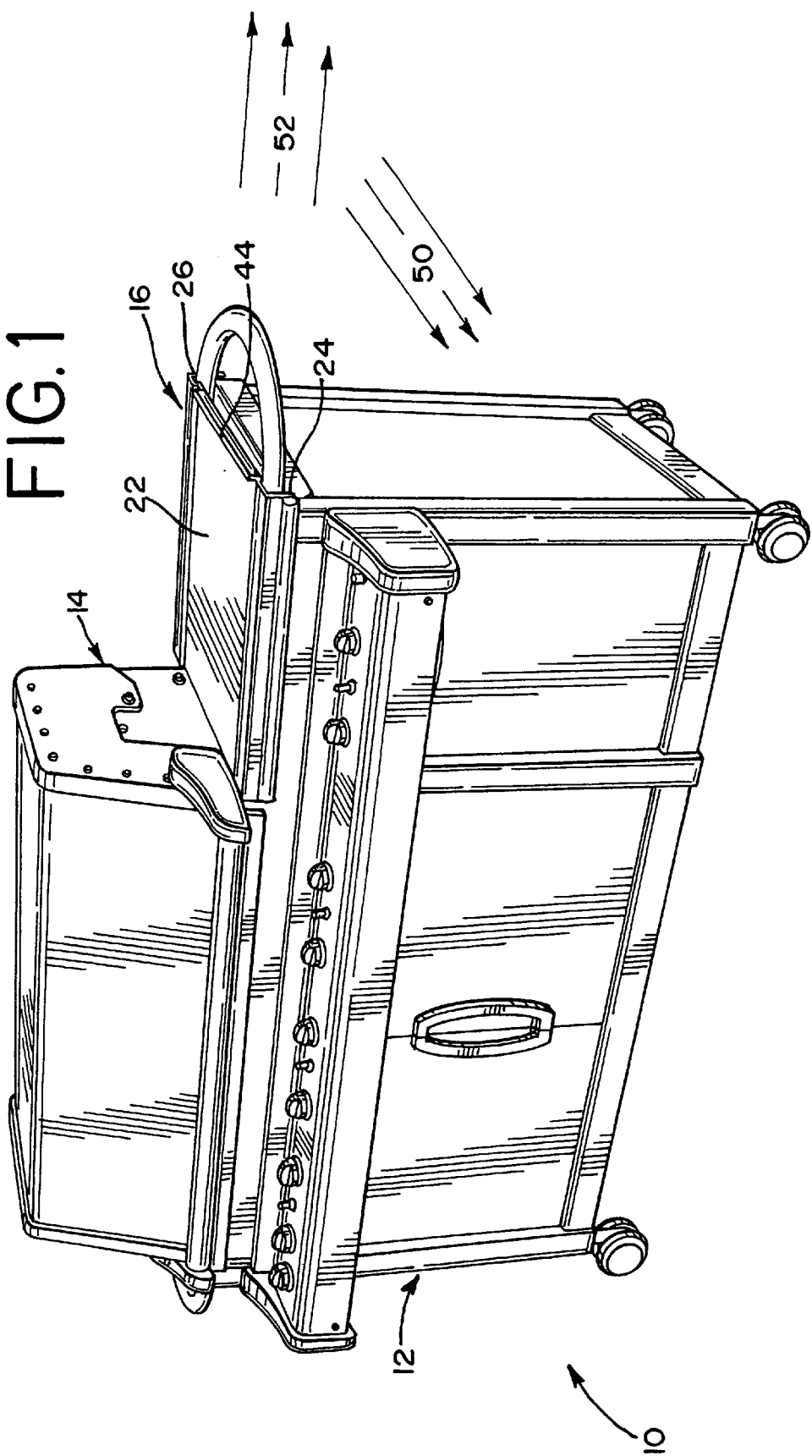
FIG. 1 is a perspective view of a gas grill incorporating an embodiment of a slidable surface assembly of the present invention.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

Figure 2:
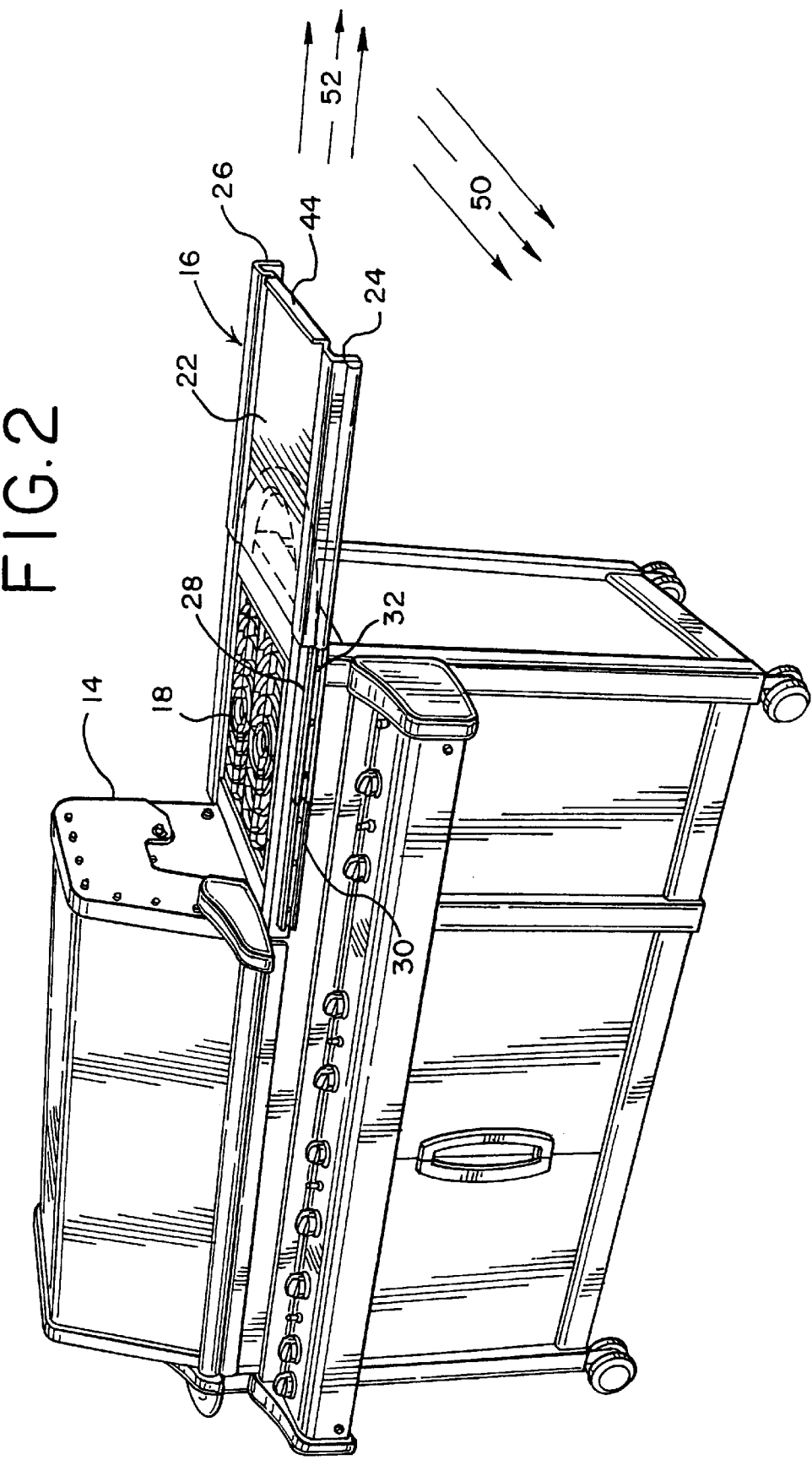
FIG. 2 is a perspective view of the gas grill of FIG. 1 showing the slidable surface in an open position.
Figure 3:
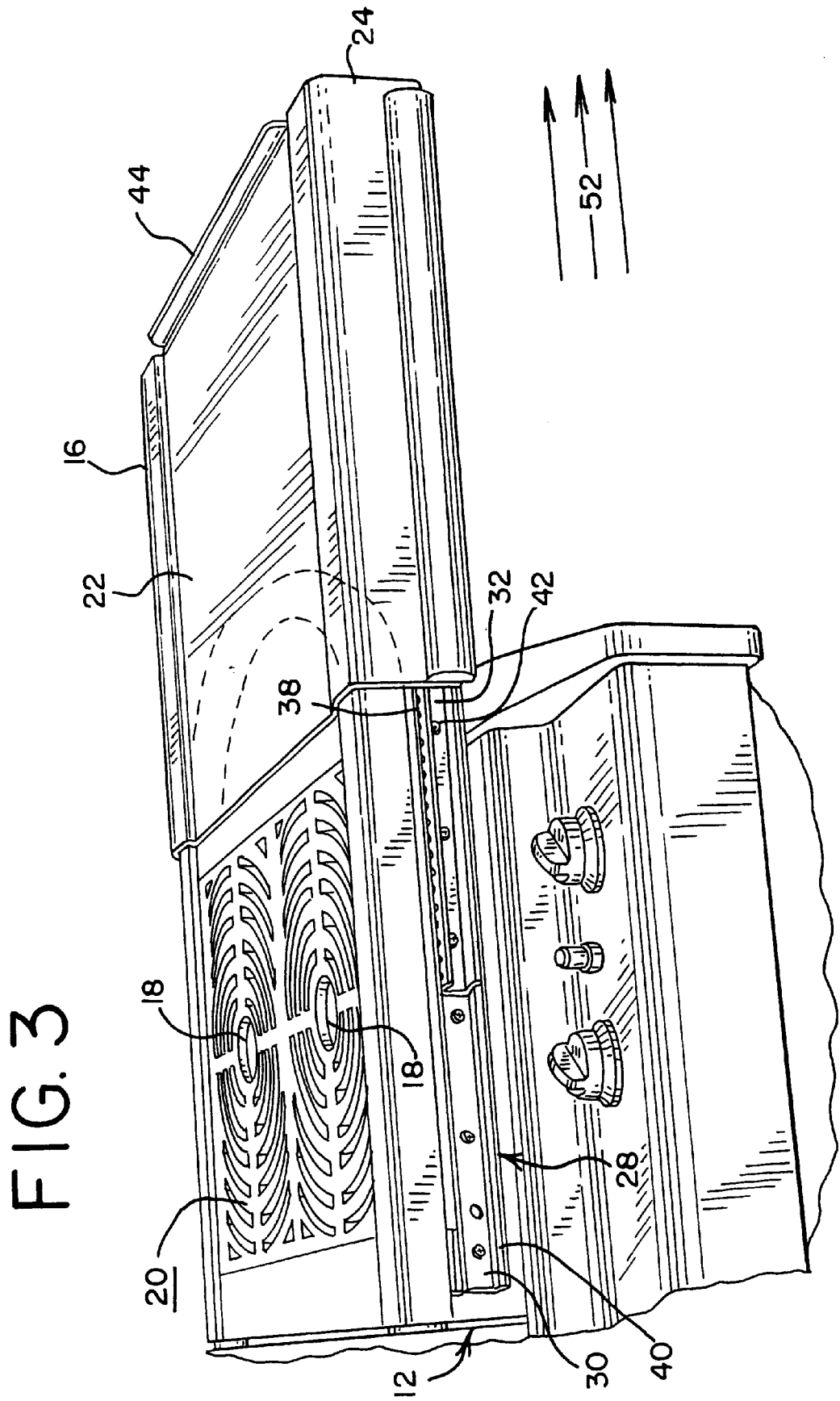
FIG. 3 is a partial perspective view of the slidable surface assembly shown in FIGS. 1 and 2.
Figure 4:
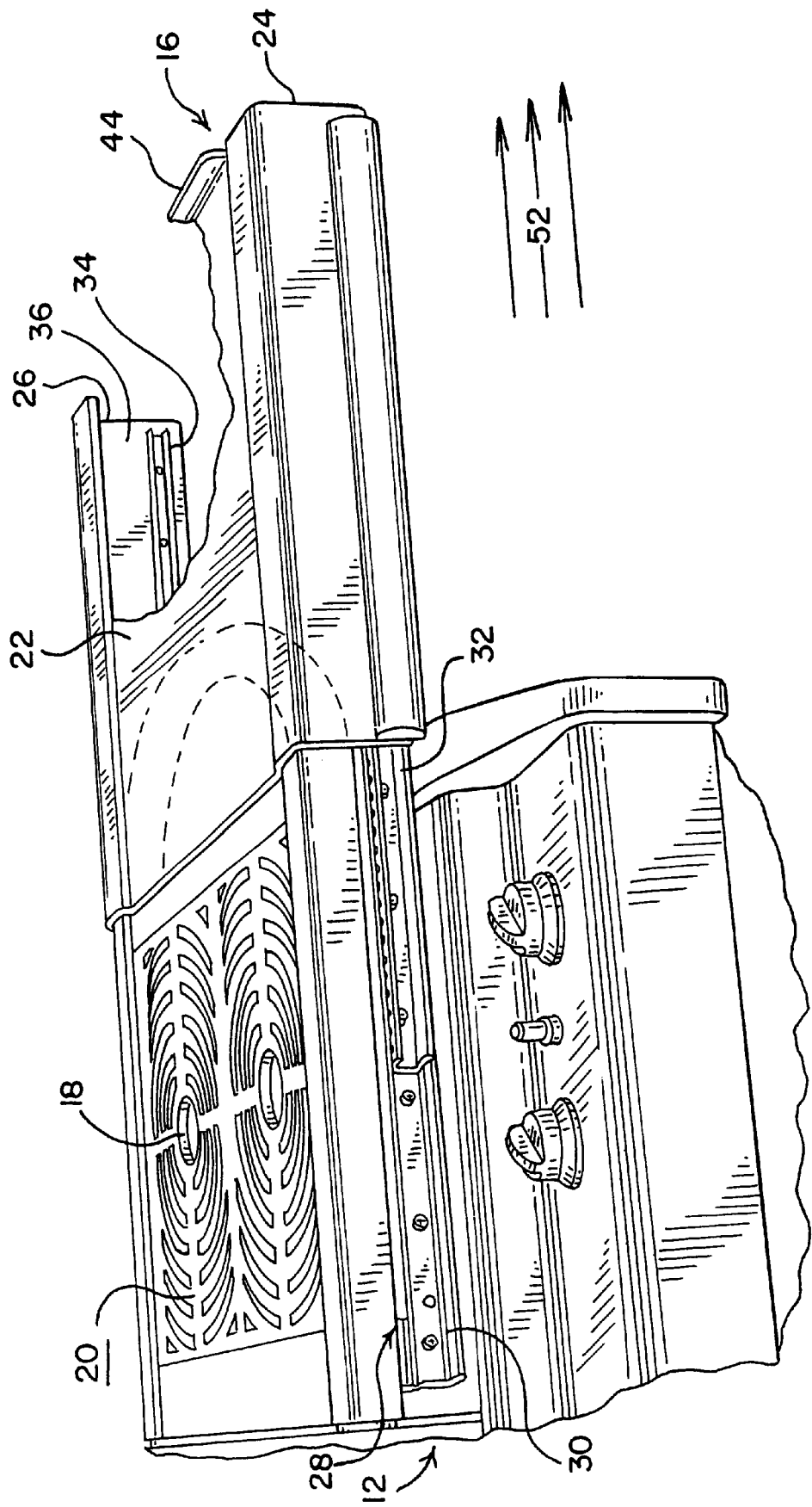
FIG. 4 is a partial perspective view of the slidable surface assembly having a portion cutaway to expose a track bearing surface and a second track segment of the assembly.

FIG. 1 shows a barbecue gas grill 10 having a frame 12 and a cooking chamber 14. The grill 10 includes a work shelf surface 16, preferably as a combination burner cover and work shelf surface, that is slidably connected to the frame 12 of the grill 10 and covers an auxiliary burner 18 disposed adjacent to the cooking chamber 14, as shown in FIG. 2. FIG. 2 shows the surface/cover 16 in an open position. The surface/cover 16 is shown in a closed position in FIG. 1. The auxiliary burner 18 includes a generally flat cooking grate surface 20 disposed over a burner unit (not shown), as best shown in FIG. 3. The auxiliary burner 18 may include more than one burner unit.

Referring to FIGS. 2 and 3, the surface/cover 16 preferably comprises a generally flat body portion 22 and two depending side flanges 24 and 26 that are transverse to the body portion 22. The surface/cover 16 is slidably mounted to the frame 12 via a sliding mechanism in the form of at least one slide track assembly 28. Preferably, the assembly provides two generally opposed and parallel slide track assemblies 28. For simplicity, only one of the two slide track assemblies 28 is shown in the drawings, but both are substantially identical. Each of the slide track assemblies includes a first track segment 30, an intermediate track segment 32, and a second track segment 34. The first track segment 30 is connected to the frame 12 of the grill 10, while the second track segment 34 is connected to a slide-engaging surface 36 of one of the flanges 24 and 26. In the preferred embodiment, the slide engaging surface 36 is located on the inner surface of the depending flanges 24, 26. Alternatively, the surface may be on an outer edge of the cover/shelf 16. The intermediate track segment 32 slidably engages both the first track segment 30 and the second track segment 34 to allow the body portion 16 to be extended laterally with respect to the auxiliary burner 18. Each of the track portions 30, 32 and 34 linearly slide with respect to each other to provide a telescoping action to the slide track assemblies 28.

In a preferred embodiment, the slide track assemblies 28 are similar to drawer-track slides having a plurality of ball bearings 38 disposed between a track bearing surface 40 of the first track segment 30 and a track bearing surface 42 of the intermediate track segment 32. Alternatively, ball bearings can also be placed between bearing surfaces of the intermediate track segment 32 and the cover second track segment 34. The ball bearings 38 provide a low-resistance sliding mechanism and also provide load bearing surfaces between the track bearing surfaces 40 and 42 when a load is placed upon the surface/cover 16. This enables the sliding mechanism to function even when a load is placed upon the surface/cover 16 when it is in an open, or extended position, as shown in FIGS. 2 and 3. The slide-track assemblies 28 provide support to the body 16 to resist a moment created by a load upon the surface/cover 16 so that it can be used as a work surface while maintaining function of the slide mechanism.

The surface/cover 16 includes a handle portion 44 adapted to provide an area a person can grasp at the handle portion 44 to slide the surface/cover 16. The surface/cover 16 is preferably made of steel and the handle portion 44 is preferably integrally formed with the surface/cover 16 utilizing metal forming techniques well known in the art of metal fabrication and forming.

It is contemplated that the surface/cover 16 and associated slide mechanism can also be disposed on the frame 12 of the grill 10 to allow the surface/cover 16 to slide and extend from the frame 12 in a front-to-back motion as well as a side-to-side, in lateral motion. In this embodiment, the surface/cover 16 extends as a work surface in a forward direction 50, rather than the lateral side direction 52 as disclosed above, and shown in FIG. 2. Therefore, this embodiment provides a front work shelf 16 extended to a position adjacent the user of the grill assembly. This embodiment of a forward direction 50 work shelf 16 provides a surface supported by extended cantilever brace, without the use of other braces or brackets secured between the work shelf 16 and the frame 12.

In the preferred embodiment, the surface/cover 16 and cooperating sliding mechanism provides a convenient combination burner cover and work surface. This combination allows both a work surface and an auxiliary burner to be positioned on the same side of the grill frame without requiring a longer grill frame for support. This combination eliminates the need to position a separate work surface on the other side of the cooking chamber, opposite the auxiliary burner. Alternatively, this combination also allows the grill to accommodate two work surfaces, one on each side of the cooking chamber, without significantly increasing the size of the grill and without extended frame to support the sliding body 16.

In another embodiment, a locking mechanism (not shown) may be provided to selectively lock the surface/cover 16 in either the first position or the extended second position. The means for locking the surface/cover 16 in a position may include, in combination or alone, a mechanical locking pin or stop activated between the frame 12 and the surface/cover 16, or between the segments 30, 32, 34 of the slide track assemblies 28. Alternative means may also include a detent and projection (not shown) within the segments 30, 32, 34 of the sliding track assemblies 28, similar to common drawer tracking mechanisms. Incorporating such mechanisms into an extendable sliding work surface on a barbecue grill assembly provides a unique variation from common drawer tracking, however, in that the present invention provides an exposed work surface 16 selectively positioned to alternative lateral positions.

While the specific embodiments have been illustrated and described, numerous modifications come to mind without significantly departing from the spirit of the invention, and the scope of protection is only limited by the scope of the accompanying Claims.

What is claimed is:

1. An outdoor cooking assembly comprising:
   a stove top burner, and a cover having a generally flat surface portion and at least one slide engaging surface having a track assembly, the track assembly allowing the cover to be slidably moved with respect to the burner from a first position wherein the cover at least partially covers the burner to a second position generally away from the burner.

2. The assembly of claim 1, wherein the cover is slidably connected to the frame with at least two generally parallel linear slide tracks that cooperatively guide linear movement of the cover with respect to the burner.

3. The assembly of claim 2, wherein one of said slide tracks is positioned along a first edge and another of said tracks is positioned along a second edge generally parallel to said first edge.

4. The assembly of claim 3, wherein the first edge and second edge are separated by said flat surface portion.

5. The assembly of claim 1, wherein the generally flat surface portion is adapted to provide an exposed horizontal surface for use as a work surface.

6. The assembly of claim 1, wherein the cover extends away from the burner in cantilevered support when in said second position.

7. The assembly of claim 1, further comprising a handle secured to said cover and adapted to be grasped for sliding manipulation of the cover.

8. The assembly of claim 1, further comprising a locking mechanism adapted to selectively lock the cover in said second position.

9. An outdoor cooking assembly comprising:
   a frame assembly;
   a stove top burner assembly attached to the frame assembly; and a cover body adapted to position over the stove top burner in a first position, said body adapted to laterally slide to a second position to at least partially expose the burner.

10. The assembly of claim 9, wherein the cover body is slidably connected to the frame with linear slide tracks that allow linear movement of at least a portion of said body relative to said burner.

11. The assembly of claim 9, wherein the cover body has a substantially flat surface adapted to provide an exposed horizontal surface in the first position.

12. The assembly of claim 9, further comprising a handle member adapted to be grasped for sliding manipulation of the cover body.

13. The assembly of claim 1, further comprising a locking mechanism adapted to selectively lock the cover in said second position.

14. An outdoor cooking assembly having a frame and a surface burner with a cover assembly, the assembly comprising:
- a cover having a generally flat body portion and two side surfaces disposed transverse to the body portion, the body portion being positioned generally over the burner when the cover is in a closed position, each of the side surfaces having a first track segment, and;
- a plurality of mating linear slide track segments, each said mating segment secured to the frame and adapted to slidably engage with a first track segment to allow the cover to selectively be laterally extended away from the closed position.

15. An outdoor cart assembly having a frame and sliding work surface, comprising;
- a frame formed of a plurality of frame members and having an extent of a generally horizontal planar area with a slidable work surface having a surface body with a generally flat top surface;
- said slidable work surface body being secured to the frame by mating tracking segments and being adapted to laterally slide from a first position to a second position substantially adjacent said first position.

16. The assembly of claim 15, wherein the work surface is slidably connected to the frame with at least two generally parallel linear slide tracks that cooperatively guide linear movement of the assembly, each said slide track being positioned along an outer edge having a surface generally transverse to said work surface.

17. The assembly of claim 16, wherein the first edge and second edge are separated by a generally flat upper surface.

18. The assembly of claim 15, wherein the slidable work surface is adapted to laterally extend adjacent the frame when placed in said second position.

19. The assembly of claim 15, further comprising a handle secured to said work surface body and adapted to be grasped for sliding manipulation of said body.

20. The assembly of claim 15, further comprising a locking mechanism adapted to selectively lock the work surface body in said second position.

21. The assembly of claim 15, wherein the work surface body is adapted to cover a stove top burner when in the first position, and the body slidably moves to the second position adjacent the burner.

22. The assembly of claim 15, wherein assembly further comprises a barbecue grill cooking chamber having a firebox, and a lid, said work surface being positioned adjacent said cooking chamber.

23. The assembly of claim 15, further comprising a second work surface body slidably secured to the frame and adapted to be selectively moved from a first position to an adjacent second position.

* * * * *